United States Patent
Kuranaka et al.

(10) Patent No.: US 6,660,431 B1
(45) Date of Patent: Dec. 9, 2003

(54) HYDROGEN ABSORBING ALLOY ELECTRODE, ELECTRODE PRODUCING METHOD AND ALKALI STORAGE BATTERY

(75) Inventors: Sou Kuranaka, Osaka (JP); Akihiro Maeda, Toyohashi (JP); Yoshio Moriwaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/913,013

(22) PCT Filed: Feb. 24, 1999

(86) PCT No.: PCT/JP99/00838

§ 371 (c)(1),
(2), (4) Date: Aug. 8, 2001

(87) PCT Pub. No.: WO00/51195

PCT Pub. Date: Aug. 31, 2000

(51) Int. Cl.$^7$ ................................. H01M 4/58
(52) U.S. Cl. .................... 429/218.2; 429/223; 429/224; 429/59; 429/101; 420/416; 420/443; 420/452; 420/455; 420/900; 75/351; 75/370; 427/123
(58) Field of Search ........................ 429/59, 101, 218.2, 429/223, 224; 75/351, 370; 427/123; 420/416, 443, 452, 455

(56) References Cited

U.S. PATENT DOCUMENTS

| | | | | |
|---|---|---|---|---|
| 4,421,718 A | * | 12/1983 | Osumi et al. | ............... 420/443 |
| 5,389,333 A | * | 2/1995 | Li et al. | ..................... 420/455 |
| 5,554,456 A | | 9/1996 | Ovshinsky et al. | |
| 5,837,317 A | * | 11/1998 | Moriwaki et al. | .......... 427/217 |
| 5,840,166 A | | 11/1998 | Kaneko | |
| 5,879,429 A | | 3/1999 | Yamamura et al. | |
| 5,962,156 A | * | 10/1999 | Izumi et al. | ................. 429/59 |
| 6,066,415 A | * | 5/2000 | Sakai et al. | ............... 429/218.2 |
| 6,200,705 B1 | * | 3/2001 | Hayashida et al. | ...... 429/218.2 |
| 6,214,492 B1 | * | 4/2001 | Kono et al. | .............. 429/218.2 |
| 6,248,475 B1 | * | 6/2001 | Hayashida et al. | ...... 429/218.2 |
| 6,268,084 B1 | * | 7/2001 | Hayashida et al. | ...... 429/218.2 |

FOREIGN PATENT DOCUMENTS

| | | | |
|---|---|---|---|
| JP | 61091863 A | 5/1986 |
| JP | 61233969 A | 10/1986 |
| JP | 02027737 A | 1/1990 |
| JP | 02068856 A | 3/1990 |
| JP | 02082448 A | 3/1990 |
| JP | 03093158 A | 4/1991 |
| JP | 04167365 A | 6/1992 |
| JP | 07326353 A | 12/1995 |
| JP | 09194971 A | 7/1997 |
| JP | 10060565 A | 3/1998 |
| JP | 10152739 A | 6/1998 |
| JP | 10237569 A | 9/1998 |

OTHER PUBLICATIONS

Y.Y. Pan, "La–Ni (Lanthanum–Nickel)", *Binary Alloy Phase Diagrams Second Edition*, vol. 1, pp. 2406–2408, (Aug. 1992).

*Chemical Abstracts*, 114:148215, S. Kamasaki et al., "Structure and Hydrogen Absorption Characteristics of Sputtered Lanthanum–nickel Alloy Films", *Hyomen Gijutsu*, 41 (11), 1168–73 (1990) no month available.

* cited by examiner

*Primary Examiner*—Bruce F. Bell
(74) *Attorney, Agent, or Firm*—Akin, Gump, Strauss, Hauer & Feld, L.L.P.

(57) ABSTRACT

The present invention relates to a hydrogen storage alloy electrode composed of a hydrogen storage alloy having a $CaCu_5$ region and a $Ce_2Ni_7$ region in the crystal structure and satisfies the relational formula: $p:q=1:(4+a)$, where p is the sum of the mole fraction of an element occupying the Ca site of the $CaCu_5$ region and the mole fraction of an element occupying the Ce site of the $Ce_2Ni_7$ region, q is the sum of the mole fraction of an element occupying the Cu site of the $CaCu_5$ region and the mole fraction of an element occupying the Ni site of the $Ce_2Ni_7$ region, and $-0.2 \leq a \leq 0.4$. Accordingly, although the hydrogen storage alloy electrode contains a little or no Co, it is possible to obtain an electrode having little deterioration due to pulverization of the alloy and a high capacity.

10 Claims, 4 Drawing Sheets

HYDROGEN ABSORBING ALLOY ELECTRODE, ELECTRODE PRODUCING METHOD AND ALKALI STORAGE BATTERY

BACKGROUND OF THE INVENTION

The present invention relates to a hydrogen storage alloy electrode capable of electrochemically absorbing and desorbing hydrogen, a method for producing the electrode, and an alkaline storage battery comprising the electrode.

Conventionally, various types of metals and alloys, such as Cd used for the negative electrodes of nickel-cadmium storage batteries, Fe and Zn, have been used for the negative electrodes of alkaline storage batteries. Among them, hydrogen storage alloys have been practically used for the negative electrodes of nickel-hydrogen storage batteries.

For the current nickel-cadmium storage batteries, rare earth-nickel based alloys have been mainly used. Regarding alloys other than rare earth-nickel based alloys, research of alloys of a group called Laves phase alloys has been made so as to achieve negative electrodes with higher capacity. Moreover, research has been made for alloys such as V—Ti—Ni based alloys that are produced by using V and T, which show excellent hydrogenation properties even when used alone, as bases and adding Ni to impart electrochemical activity for use in batteries.

However, these alloys have not yet been put into practical application in view of total performance of batteries including life characteristics and storage characteristics.

On the other hand, an $AB_5$ type alloy is given as one of main practically used alloys. This $AB_5$ type alloy is an alloy among rare-earth metal alloys, composed of an element having strong hydrogen affinity (A element), such as a rare-earth element, and an element (B element) having week hydrogen affinity, such as transition element, in a stoicheiometric ratio (A:B) of 1:5, and has a $CaCu_5$ type crystal structure of hexagonal system.

Conventionally, research and development have being made for this $AB_5$ type alloy among the rare-earth based alloys, and a variety of alloys having a wider range of compositions compared to compositions depending on the stoicheiometric ratio have been proposed (for example, Japanese Laid-open Patent Publication No. Sho61-91863, and the like). Among alloys having such a non-stoicheiometric composition ratio, an alloy which is rich in A is proposed as an alloy having a particularly high capacity (for example, Japanese Laid-open Patent Publication No. Hei2-27737, the description of Japanese Patent No. 2680623, and the like).

Furthermore, the description of Japanese Patent No. 2680628 discloses a hydrogen storage alloy electrode composed of a mixture of a hydride reactive with oxygen preferentially to the above alloy and not concerned with charge/discharge reaction of an electrode and an alloy having a $CaCu_5$ type crystal structure. According to this hydrogen storage alloy electrode, it is possible to limit oxidation and deterioration of the hydrogen storage alloy contributing to a charge/discharge reaction of the electrode and preliminarily charge a negative electrode. It is therefore possible to improve the cycle characteristics.

Besides, as rare-earth based alloys other than the $AB_5$ type alloy, an alloy ($A_2B_7$ type alloy) with the A:B ratio of 2:7 has also being a subject of research and development (for example, Japanese Laid-open Patent Publications Nos. Hei9-194971, Hei10-60565, and the like). It has been known that this $A_2B_7$ type alloy is transformed to amorphous when it is hydrated, and a battery disclosed in Japanese Laid-open Patent Publication No. Hei10-60565 has reached a level for practical application although it is relatively difficult to control the discharge characteristics and ensure the life characteristics.

In addition, the specification of U.S. Pat. No. 5,840,166 discloses hydrogen storage alloy electrodes whose performance was improved by mainly using light rare-earth (La, Ce, Pr, Nd) as the A element in a wide range of alloys with the A:B ratio of 1:3 to 1:4 and adding heavy rare-earth (such as Gd) or Y, Sc, Mg, Ca so as to contain anti-phase boundaries extending perpendicular to the C-axis of a crystal grain particularly.

Since the Co contained in the above-described rare earth-nickel based alloys is a rare resource and expensive, rare earth-nickel based alloys having compositions with a reduced Co content have been desired for a reduction in the costs of alkaline storage batteries.

However, when a hydrogen storage alloy mainly composed of a rare-earth based alloy is used for an alkaline storage battery, whether Co is substantially contained in the alloy is an important factor in improving corrosion resistance to an electrolyte and limiting pulverization of the alloy caused by cycle deterioration.

Hence, it is the first object of the present invention to solve the above-described problems and reduce the costs by containing a little or no Co in the hydrogen storage alloy electrode of an alkaline storage battery. The second object is to improve the corrosion resistance to an electrolyte and the life characteristics of the battery by limiting pulverization of the alloy caused by deterioration of cycles.

SUMMARY OF THE INVENTIONS

The present invention relates to a hydrogen storage alloy electrode composed of a hydrogen storage alloy which has a $CaCu_5$ type region and a $Ce_2Ni_7$ type region in the crystal structure thereof and satisfies the relational formula: $p:q=1:(4+a)$, where p is the sum of the mole fraction of an element occupying the Ca site of the $CaCu_5$ type region and the mole fraction of an element occupying the Ce site of the $Ce_2Ni_7$ type region, q is the sum of the mole fraction of an element occupying the Cu site of the $CaCu_5$ type region and the mole fraction of an element occupying the Ni site of the $Ce_2Ni_7$ type region, and $-0.2 \leq a \leq 0.4$.

In this case, it is preferred that the hydrogen storage alloy is represented by the compositional formula: $R(Ni_{1-y}Mn_y)_{4+a}M_b$, where R is at least one kind of La, Ce, Sm, Nd, Pr and misch metal, M is at least one kind of Fe, Cr, Cu and Al, $0.05 \leq y \leq 0.4$, $-0.2 \leq a \leq 0.4$, $0 \leq b \leq 0.4$, and $a+b \leq 0.4$.

Moreover, it is preferred that the hydrogen storage alloy contains 1 to 10% by weight of L, where L is at least one kind of Ti, V, Zr, Nb, Mo, Si and Ge.

Furthermore, it is preferred that particles of Co are present on a surface of the hydrogen storage alloy.

Besides, the present invention also relates to a method for producing a hydrogen storage alloy electrode, comprising: (a) preparing components satisfying the compositional formula: $R(Ni_{1-y}Mn_y)_{4+a}M_b$, where R is at least one kind of La, Ce, Sm, Nd, Pr and misch metal, M is at least one kind of Fe, Cr, Cu and Al, $0.05 \leq y \leq 0.4$, $-0.2 \leq a \leq 0.4$, $0 \leq b \leq 0.4$, and $a+b \leq 0.4$; (b) melting the components and synthesizing and obtain a hydrogen storage alloy by an atomization method, a roll rapid quenching method or a centrifugal spraying method; (c) heat-treating the hydrogen storage alloy in a vacuum or in an inert gas at a temperature between 500° C. and 1065° C.; and (d) joining the hydrogen storage alloy and a support integrally to form an electrode.

In this case, after step (c) but before step (d), it is preferred to immerse-treat the hydrogen storage alloy in an alkali solution, which has a temperature between 80° C. and a boiling point and contains a cobalt oxide, cobalt hydroxide or cobalt salt added thereto.

Further, it is preferred to comprise the step of adding 1 to 10% by weight of L, where L is at least one kind of Ti, V, Zr, Nb, Mo, Si and Ge, to the hydrogen storage alloy.

In addition, the present invention relates to an alkaline storage battery comprising: a negative electrode mainly composed of the above hydrogen storage alloy; a positive electrode mainly composed of nickel hydroxide; a separator formed of non-woven fabric, for example, which electrically separates the negative electrode and the positive electrode; an alkaline electrolyte; and a sealed container with a safety valve.

In this case, it is preferred that particles of Co are present on a surface of the hydrogen storage alloy.

Further, it is preferred that the hydrogen storage alloy contains 1 to 10% by weight of L, where L is at least one kind of Ti, V, Zr, Nb, Mo, Si and Ge.

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

DETAILED DESCRIPTION OF THE INVENTION

The present invention relates to a hydrogen storage alloy electrode composed of a hydrogen storage alloy which has a $CaCu_5$ type region and a $Ce_2Ni_7$ type region in the crystal structure thereof and has a composition satisfying the relational formula p:q=1:(4+a), where p is the sum of the mole fraction of an element occupying the Ca site of the $CaCu_5$ type region and the mole fraction of an element occupying the Ce site of the $Ce_2Ni_7$ type region, q is the sum of the mole fraction of an element occupying the Cu site of the $CaCu_5$ type region and the mole fraction of an element occupying the Ni site of the $Ce_2Ni_7$ type region, and $-0.2 \leq a \leq 0.4$.

Here, the hydrogen storage alloy of the present invention microscopically has two regions (phases) of the $CaCu_5$ type region and the $Ce_2Ni_7$ type region in the crystal structure thereof, but it is macroscopically a uniform and homogeneous hydrogen storage alloy.

Moreover, it is considered that the hydrogen storage alloy may contain impurities, such as unavoidable deposits such as oxides and hydroxides produced by reactions of the alloy with oxygen and moisture in the atmosphere and purification residues contained in the raw materials for alloy, but if their amount is less than about 1% by weight, they do not influence the effects of the present invention.

The reasons why a hydrogen storage alloy having a two-phase structure comprising a region with a $CaCu_5$ type crystal structure and a region with a $Ce_2Ni_7$ type crystal structure was used as the hydrogen storage alloy of an alkaline storage battery of the present invention are as follows.

Specifically, it is considered that the amount of A-element components contained in the region having the $CaCu_5$ type crystal structure is small and deterioration caused by pulverization is reduced, and further formation of a composite of the region having the $Ce_2Ni_7$ type crystal structure with a high hydrogen storage capacity in a gaseous phase and the region having the $CaCu_5$ type crystal structure with a high electrode capacity would increase the overall electrode capacity of the electrochemical hydrogen storage alloy.

Figure 1:
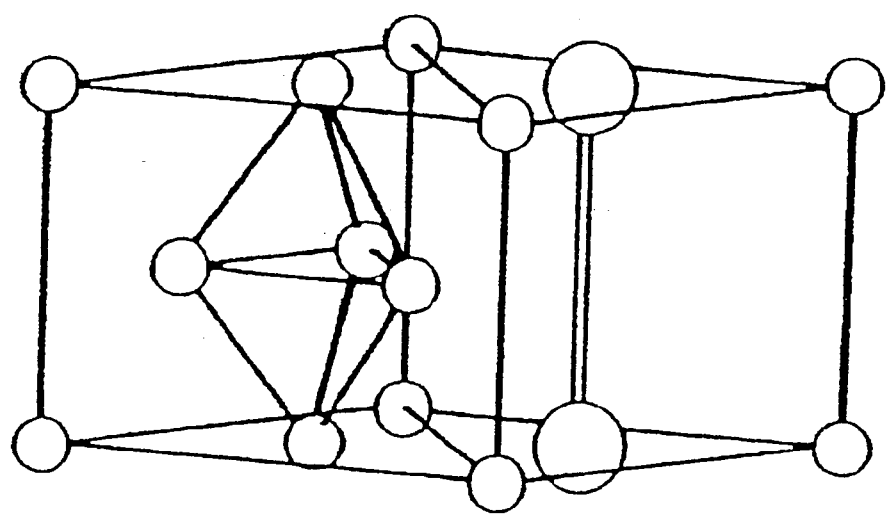
FIG. 1 is a view showing a $CaCu_5$ type crystal structure.
Figure 2:
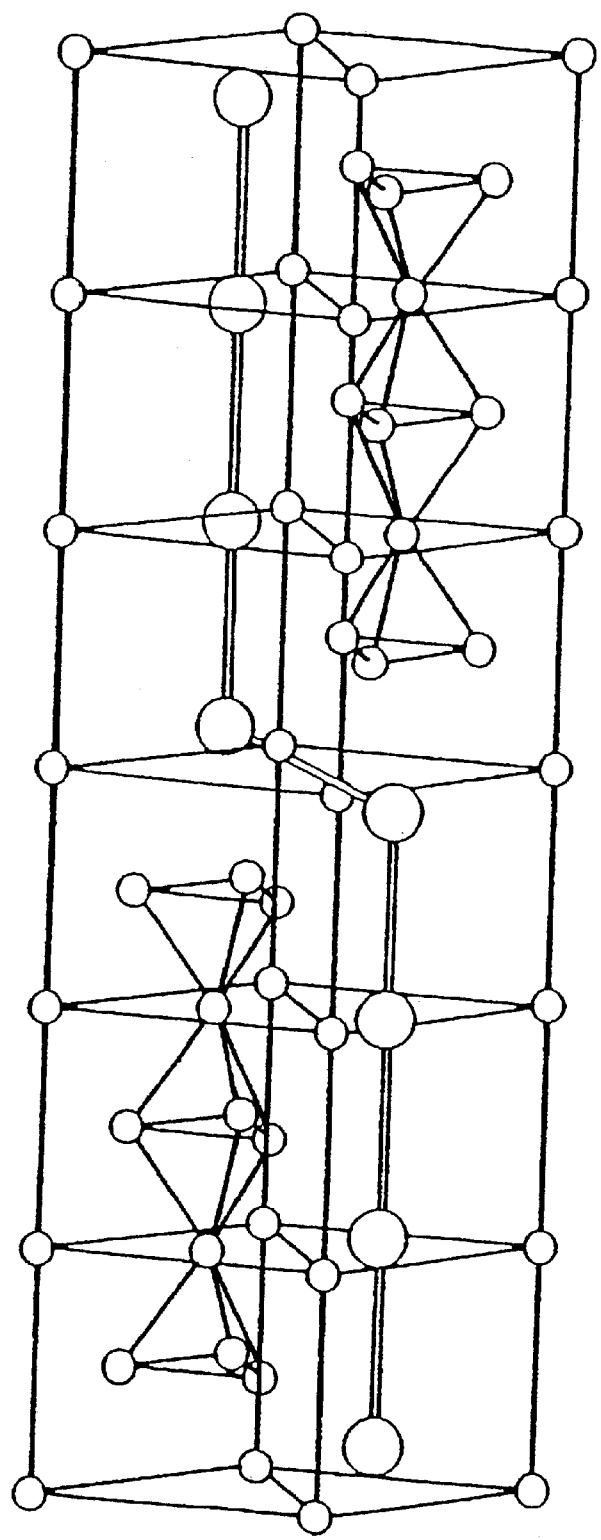
FIG. 2 is a view showing a $Ce_2Ni_7$ type crystal structure.

The following description will explain the structure of the hydrogen storage alloy of the present invention by referring to FIGS. 1 and 2 to facilitate understanding.

FIG. 1 shows a $CaCu_5$ type crystal structure, and FIG. 2 shows a $Ce_2Ni_7$ type crystal structure. It can be appreciated from FIGS. 1 and 2 that these two crystal structures are very much alike and are seen as if similar unit cells are piled up in different orders.

When crystals of such an alloy are grown from one solution, crystal faces of the same arrangement are shared by the $CaCu_5$ type region and the $Ce_2Ni_7$ type region, resulting in a homogenous alloy with boundaries that are atomically continuous in part.

Accordingly, it is considered that the hydrogen storage alloy of the present invention has characteristics, such as smooth movement hydrogen transfer during charge/discharge, different from a simple mixture of two types of hydrogen storage alloys. Actually, the function and effect of such a composite are not exhibited in a composition range which is departed from the composition range of the present invention and in which the $Ce_2Ni_7$ type region is transformed to amorphous.

Therefore, such a function is completely different from a function obtained when a crystalline hydrogen storage alloy and an amorphous hydrogen storage alloy coexist as disclosed in Japanese Laid-Open Patent Publication No. Hei4-167365 and Chemical Abstract CA114:148215.

Moreover, the function and effect of such a composite are also not observed when hydrogen storage alloys having two types of crystal structures are simply mixed as disclosed in the specifications of the above-mentioned Japanese Patent No. 2680628 and U.S. Pat. No. 5,554,456. The reason for this would be that, when separately synthesized alloys are mixed, the respective crystal regions are completely discontinuous and impurities such as oxides are present in the grain boundaries, and therefore close contact of the two crystal regions can not be achieved.

Next, in the hydrogen storage alloy having a two-phase structure of the present invention, it is preferred to satisfy the relational formula p:q=1:(4+a), where p is the sum of the mole fraction of an element occupying the Ca site of the $CaCu_5$ type region and the mole fraction of an element occupying the Ce site of the $Ce_2Ni_7$ type region, q is the sum of the mole fraction of an element occupying the Cu site of the CaCu$_5$ type region and the mole fraction of an element occupying the Ni site of the Ce$_2$Ni$_7$ type region, and $-0.2 \leq a \leq 0.4$, more preferably $0 \leq a \leq 0.2$.

The reason for this is that, when $a < -0.2$, there is almost no CaCu$_5$ type region. In this case, the Ce$_2$Ni$_7$ type region forms an alloy having a nonstoicheiometric composition ratio rich in the B element in a, and is transformed to amorphous upon absorption of hydrogen. Therefore, for reasons such as an increase in the plateau pressure, the capacity that can be actually used for charge/discharge of the battery is reduced. On the other hand, when $a > 0.4$, there is almost no Ce$_2$Ni$_7$ type region. In this case, since the CaCu$_5$ type region also forms an alloy having a nonstoicheiometric composition ratio rich in the A element and does not contain Co, the alloy is easily pulverized during charge/discharge of the battery, resulting in a poor cycle life.

A further reason is a founding as the result of eager study that the effect of the composite of two types of hydrogen storage alloys of the present invention is most effectively exhibited when $0 \leq a \leq 0.2$ in which the resulting alloy contains almost the same proportion of the CaCu$_5$ type region and the Ce$_2$Ni$_7$ type region in a volume ratio.

Furthermore, as to be described hereinbelow, the above-mentioned ratio p:q can be controlled by adjusting the amounts of component elements constituting the hydrogen storage alloy.

A specific example of the composition of the above-mentioned hydrogen storage alloy having the two-phase structure is given by the compositional formula: $R(Ni_{1-y}Mn_y)_{4+a}M_b$, where R is at least one kind of La, Ce, Sm, Nd, Pr and misch metal, preferably La, Ce and misch metal from the comprehensive standpoint including the costs of raw materials for alloy and easiness of controlling the p:q ratio, and more preferably misch metal from the standpoint of the principle object to be achieved by the alloy of the present invention, that is, a reduction of the costs.

M may be at least one kind of Fe, Cr, Cu and Al, preferably Fe, Cu and Al from the standpoint of low costs and low environmental load of the raw materials for alloy, and more preferably Cu and Al from the comprehensive standpoint including the discharge characteristics and cycle life characteristics.

Besides, the present inventors found as the result of eager study that a, b and y need to satisfy $0.05 \leq y \leq 0.4$, $-0.2 \leq a \leq 0.4$, $0 \leq b \leq 0.4$, and $a+b \leq 0.4$ in order for the hydrogen storage alloy represented by the above-mentioned compositional formula to have a two-phase structure.

In addition, it is preferred for the reason of improving the electrode characteristics and cycle life characteristics that the above hydrogen storage alloy further contains 1 to 10% by weight, preferably 3 to 7% by weight of L, where L is at least one kind of Ti, V, Zr, Nb, Mo, Si and Ge, preferably Ti, V, and Zr.

Although the effect of this addition increases in proportion to the added amount, if L exceeds 10% by weight, deposition phases other than the above-mentioned two phases increase, resulting in more demerits such as a lowering of the cycle life. Therefore, the added amount is preferably not more than 10% by weight.

In addition, it is preferred that particles of Co are present on the surface of the above hydrogen storage alloy for the reasons of increasing the alloy's corrosion resistance to an alkaline electrolyte and oxidation resistance to an oxygen gas generated from the positive electrode during overcharge. In this case, the particles of Co can be present by being chemically or physically held on the surface of the hydrogen storage alloy.

Although the particle size of the particles of Co is not particularly limited if it does not interfere with the effects of the present invention, the particle size is preferably 1 μm or less from the standpoints of the costs and necessity of covering the surface with a small amount to increase the overall capacity of the alloy, and more preferably around several tens nm from the standpoint of heightening the catalytic activity.

Next, the present invention also relates to a method for producing the above-described hydrogen storage alloy. In other words, the present invention relates to a method for producing a hydrogen storage alloy, comprising: (a) preparing components satisfying the compositional formula: $R(Ni_{1-y}Mn_y)_{4+a}M_b$, where R is at least one kind of La, Ce, Sm, Nd, Pr and misch metal, M is at least one kind of Fe, Cr, Cu and Al, $0.05 \leq y \leq 0.4$, $-0.2 \leq a \leq 0.4$, $0 \leq b \leq 0.4$, and $a+b \leq 0.4$;

(b) melting the components and synthesizing and obtaining a hydrogen storage alloy by a rapid quenching solidification method;

(c) heat-treating the hydrogen storage alloy by heating it to 500° C. to 1065° C. in a vacuum or in an inert gas; and (d) joining the resulting hydrogen storage alloy and a support integrally to form an electrode.

In the step of (a), component elements necessary for obtaining a hydrogen storage alloy of a desired composition are prepared by an ordinary method.

In the step of (b), the resulting prepared mixture is melted and a hydrogen storage alloy is synthesized and obtained by a rapid quenching solidification method. This rapid quenching solidification method is, for example, an atomization method, a roll rapid quenching method, such as a single roll method and a double-roll method, a rotary disk method, a centrifugal spraying method, or the like. Incidentally, these rapid quenching solidification methods can be implemented by conventionally known methods.

Since the hydrogen storage alloy of the present invention is within a range showing a peritectic reaction in a phase diagram, it has a large solid-phase and liquid-phase coexisting region. Therefore, when the hydrogen storage alloy is subjected to slow cooling, the composition of the liquid phase consecutively changes and is transformed to a multiphase alloy consisting of various phases, and the alloy phase that contributes to charge/discharge is decreased, resulting in a corresponding reduction in the capacity. Moreover, many types of antiphase grain boundaries are produced, causing a disadvantage to the effects of the present invention, that is, crystal faces of the same arrangement shared by the CaCu$_5$ type region and the Ce$_2$Ni$_7$ type region and atomically continuous boundaries in part are substantially reduced.

In order to solve such a disadvantage, a super rapid quenching solidification method is used to solidify the liquid phase to a solid phase before the composition of the liquid phase changes and obtain an alloy having a homogenous composition.

However, there may be a case that the alloy is distorted by rapid quenching and has an imperfect crystal structure.

Therefore, in the step of (c), a heat treatment is performed by heating the hydrogen storage alloy obtained in the step of (b).

This heat treatment is performed in a vacuum or in an inert gas, such as nitrogen, argon and helium, for a reason that the alloy is oxidized by oxygen in the atmosphere at high temperatures. Even in an inert gas atmosphere, it is preferred to perform the heat treatment under reduced pressure.

Further, the temperature and duration time of the heat treatment are suitably selected within a range in which distortion of the alloy is eliminated and a sufficiently perfect crystal structure is obtained.

However, since the $Ce_2Ni_7$ type region is segregated into a $CaCu_5$ type intermetallic compound and a liquid phase at high temperatures, the temperature of the heat treatment is preferably not higher than 1065° C. so as to prevent melting of a part of the resultant hydrogen storage alloy by the heat treatment and deterioration of homogeneity. Additionally, in order to eliminate distortion of the alloy and impart reaction energy sufficient for heightening the crystallinity, the temperature of the heat treatment is preferably not lower than 500° C. Further, a temperature between 900° C. and 1025° C. is particularly preferred.

In addition, in order to reduce the operating costs on the processes and prevent the alloy from being oxidized by a very small amount of an oxygen gas contained as an impurity in a vacuum or in an inert gas and from being poisoned by a gas generated from a deposit such an organic matter existing as a dirt in a furnace in a long-time heat treatment, the duration time of the heat treatment is preferably between 1 and 12 hours.

Here, it is preferred to apply an alkali treatment after the step of (c) but before the step of (d) by immersing the above hydrogen storage alloy in an alkali solution, which has a temperature between 80° C. and a boiling point and contains a cobalt oxide, cobalt hydroxide or cobalt salt added thereto.

The reasons for this are to remove the oxides and deposits on the surface of the resulting hydrogen storage alloy, reduce contamination of the electrolyte when the battery is constructed, and promote initial activity. A further reason is to improve the oxidation resistance of the hydrogen storage alloy and the corrosion resistance thereof to alkali by making Co present on the surface of the resulting hydrogen storage alloy as described above.

In addition, as described above, the step of adding 1 to 10% by weight, preferably 3 to 8% by weight of L, where L is at least one kind of Ti, V, Zr, Nb, Mo, Si and Ge, to the above hydrogen storage alloy is preferably performed at a stage after the step of (a) but before the step of (b).

Further, the present invention also relates to an alkaline storage battery comprising a negative electrode composed of a hydrogen storage alloy obtained as described above; a positive electrode composed of nickel hydroxide; a separator composed of non-woven fabric electrically separating the negative electrode and the positive electrode; an alkaline electrolyte; and a closed container with a safety valve.

Figure 3:
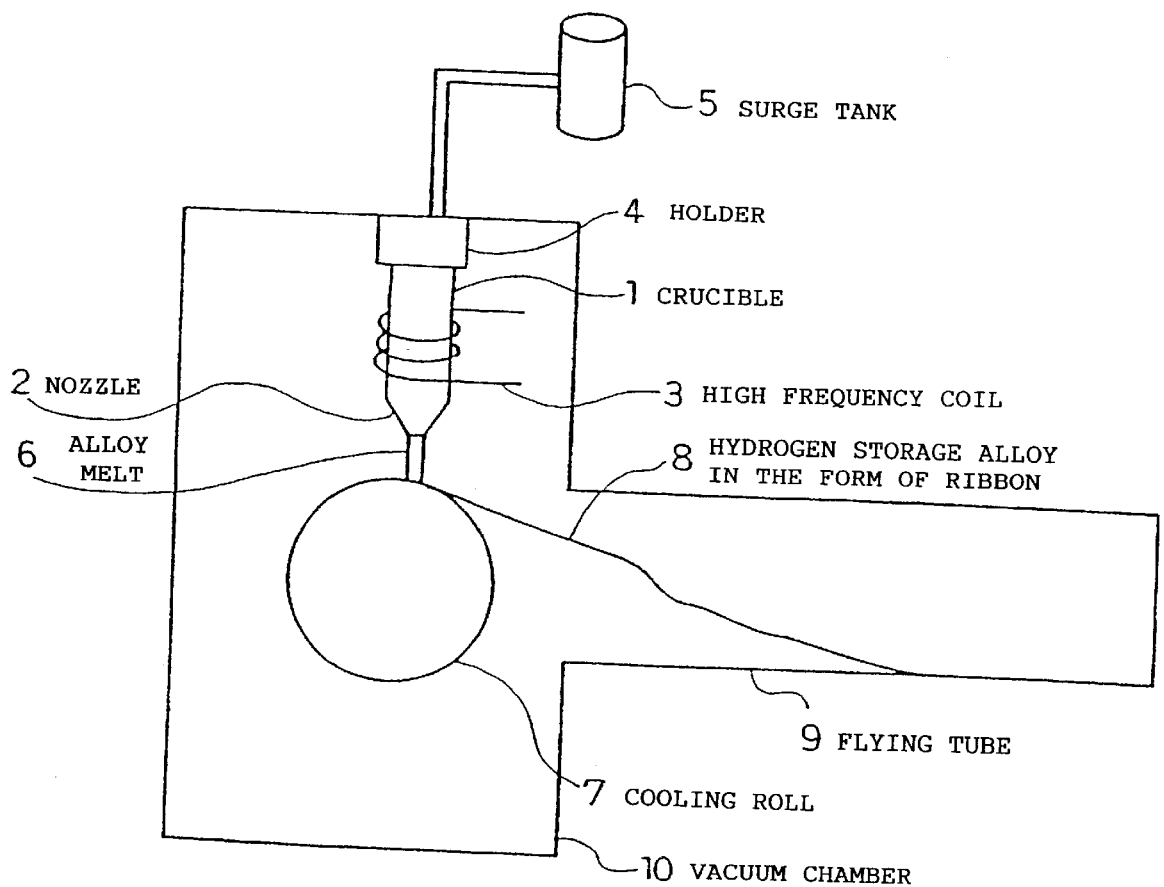
FIG. 3 is a conceptual view of a hydrogen storage alloy producing apparatus adopting a single roll method, for use in the examples of the present invention.
Figure 4:
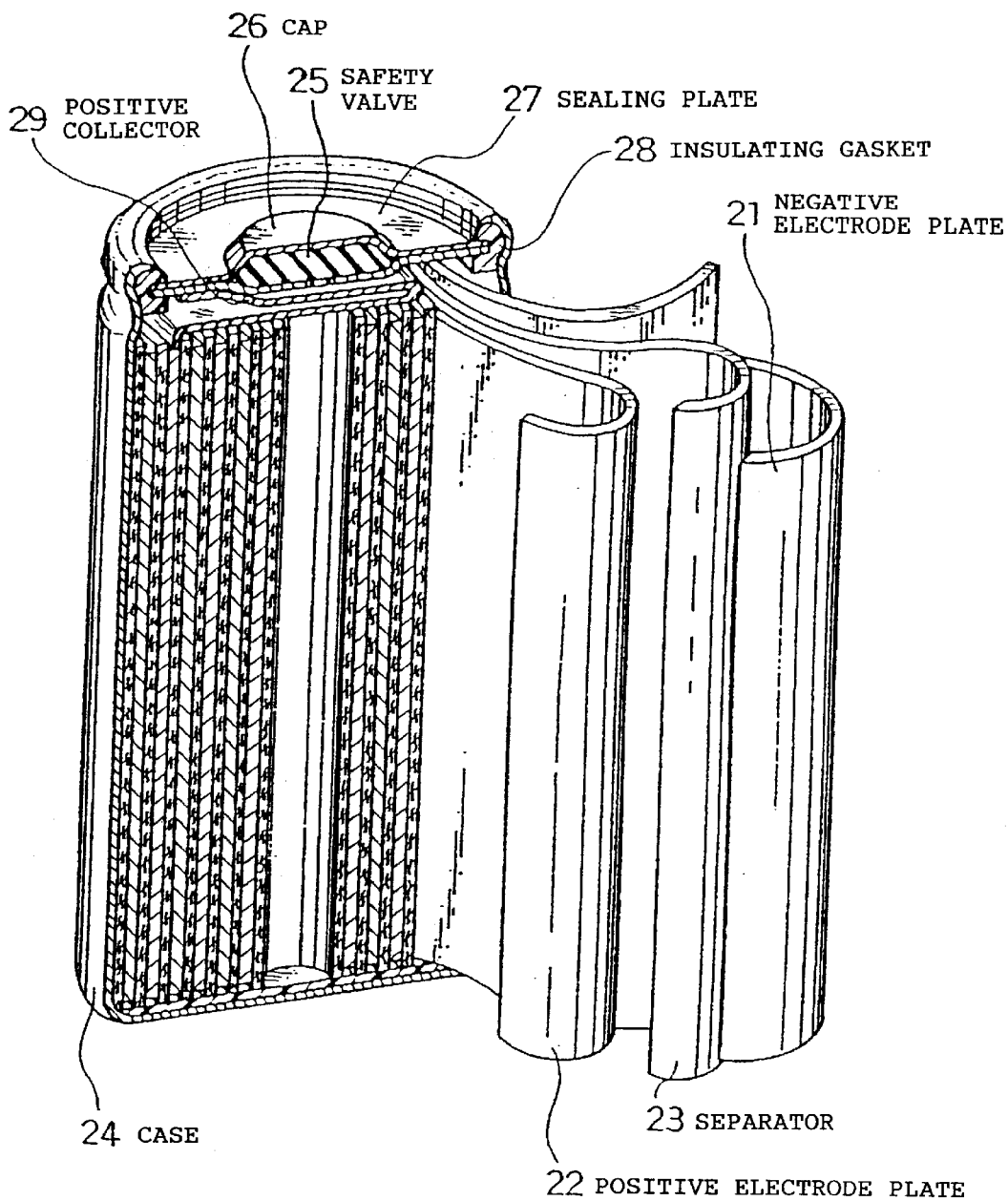
FIG. 4 is a partly broken perspective view showing the structure of an alkaline storage battery fabricated in an example of the present invention.

The following description will explain the present invention specifically with reference to FIGS. 3 and 4 and examples, but the present invention is not limited only to these figures and examples.

EXAMPLES

In the present examples, hydrogen storage alloys were synthesized by a single roll method with the use of a hydrogen storage alloy producing apparatus shown in FIG. 3. This apparatus is a super-rapid quenching alloy producing apparatus available from Nissin-Giken Kabushiki Kaisha.

First, how this apparatus is to be used will be explained. Prepared raw materials for alloy are placed in a crucible 1 having a minute through-hole (hereinafter referred to as "nozzle 2") in the bottom and set in a holder 4 through a high frequency coil 3. The holder 4 is connected to a surge tank 5 filled with an argon gas so that pressure is applicable to the inside of the crucible 1 by the argon gas. When the raw materials for alloy in the crucible 1 are heated by the high frequency coil 3 and melted to form an alloy melt 6, the alloy melt 6 is injected toward a cooling roll 7 from the nozzle 2 by the argon gas. The alloy melt 6 is immediately cooled on the cooling roll 7, becomes a hydrogen storage alloy 8 in the form of ribbon, and is stored in a sample flying tube 9. The above-described processes can be performed in a vacuum chamber 10.

Examples 1 to 46 and Comparative Examples 1 to 10

(a) Preparation

With the use of commercially available raw materials for alloy, a total of 56 types of prepared mixtures of Examples 1 to 46 and Comparative Examples 1 to 10 were obtained by mixing the raw materials for alloy to have the compositions shown in Table 1.

(b) Production of Alloy

With the use of the above-mentioned hydrogen storage alloy producing apparatus, hydrogen storage alloys (hereinafter referred simply to as "alloys") were produced by a single roll method in an argon atmosphere under reduced pressure (−150 mmHg).

(c) Heat Treatment

The alloys obtained in the step of (b) were heat-treated by heating them to 1000° C. in a vacuum for 3 hours.

[X-Ray Diffraction Measurement]

Here, the powders of the heat-treated alloys were subjected to X-ray diffraction measurement to evaluate the homogeneity and crystal structures of the alloys. The crystal structures of the alloys of Examples 1 to 46 had two phases of the $CaCu_5$ type region and the $Ce_2Ni_7$ type region. Whereas all of the alloys of Comparative Examples 1 to 10 had satisfactory homogeneity, but their crystal structures had a single phase of either the $CaCu_5$ type region or the $Ce_2Ni_7$ type region.

(c') Alkali Treatment

Each of the heat-treated alloys was subjected to mechanical pulverization, and the resulting alloy powder was subjected to an alkali treatment by immersing it for 1 hour in a 31% potassium hydroxide solution of 80° C. in which cobalt hydroxide had been dissolved.

The amount of the solution used was three times more than the amount of the treated alloy by weight, and the amount of the melted cobalt hydroxide was equivalent to 0.2% by weight of the treated alloy.

Next, the alkali-treated alloy powder was washed with water until it became neutral, and then dried in a vacuum.

(d) Production of Electrode

The dried alloy powder, 8% by weight of polytetrafluoroethylene (PTFE) as a binder and water were kneaded together to form a paste. This paste was applied to a collector composed of a punched metal sheet, dried, and rolled and pressed by a roll to fabricate a hydrogen storage alloy electrode.

[Measurement of Electrode Capacity]

Here, the capacities of the resulting alloy electrodes were measured by a half cell method.

In this single-electrode evaluation, first, the above alloy electrodes were respectively cut in strips of 3 cm in length and 6 cm in breadth, and leads were attached thereto with nickel wires. The weight of the alloy was about 3 g. Moreover, a nickel electrode having a capacity sufficiently larger than that of this electrode was provided as a counter electrode, each electrode was covered with a separator composed of non-woven fabric, and then the respective electrodes were brought into close contact by sandwiching them with acrylic plates.

Measurement samples thus obtained were placed in experimental cells using the 31% potassium hydroxide solution, and the capacities were measured. Charge/discharge conditions were charging by a current of 100 mA for 16 hours and following discharging by a current of 200 mA to a discharge cut-off voltage of 0.8 V, and the discharge capacity at the tenth cycle was taken as the electrode capacity. The results are shown in Tables 1 to 6.

[Measurement of Cycle Life]

Next, sealed alkaline storage batteries were fabricated in the manner as described below, and their cycle lives were measured.

A negative electrode was obtained by cutting each of the alloy electrodes produced by the above-described method in a size of about 4 cm in length and about 10 cm in breadth with a weight of 7.0 g. With the use of this electrode, a positive electrode composed of nickel hydroxide with a capacity of 1200 mAh and a separator, a wound electrode body was constructed by winding them. Subsequently, this electrode body was inserted into a battery can and an electrolyte was poured, and then the battery can was sealed.

FIG. 4 is a partly broken perspective view showing the structure of the resulting alkaline storage battery. In FIG. 4, a negative electrode plate 21 and a positive electrode plate 22 composed of nickel hydroxide are electrically separated from each other by a separator 23 composed of non-woven fabric placed therebetween, and they were wound and stored in a case 24.

An alkaline electrolyte (not shown) fills the case 24. The case 24 is sealed by a sealing plate 27 composed of a safety valve 25 and a cap 26, and an insulating gasket 28 to construct the alkaline storage battery. The negative electrode plate 21 is in direct contact with the case 24 and serves as the negative electrode of the battery. On the other hand, the positive electrode plate 22 is connected to the sealing plate 27 through a positive collector 29 and functions as the positive electrode of the battery.

A cycle life test was performed by charging each battery by a current of 1C (1200 mA) at 20° C. for 1.2 hours and then discharging it by the current of 1C. The discharge final voltage was 0.8 V. At this time, the number of cycles when the discharge capacity reached 70% (840 mAh) of the battery capacity was defined as the cycle life (times).

The results are shown in Table 1 to 6.

TABLE 1

| | Alloy Composition | p:q | Micro-structure | Electrode Capacity (mAh/g) | Cycle Life (times) |
|---|---|---|---|---|---|
| Ex. 1 | $Mm(Ni_{0.95}Mn_{0.05})_4$ | 1:4 | 2 phases | 320 | 615 |
| Ex. 2 | $Mm(Ni_{0.95}Mn_{0.05})_{3.8}$ | 1:3.8 | 2 phases | 280 | 786 |
| Ex. 3 | $Mm(Ni_{0.95}Mn_{0.05})_{4.4}$ | 1:4.4 | 2 phases | 340 | 380 |
| Ex. 4 | $Mm(Ni_{0.6}Mn_{0.4})_4$ | 1:4 | 2 phases | 332 | 536 |
| Ex. 5 | $Mm(Ni_{0.6}Mn_{0.4})_{3.8}$ | 1:3.8 | 2 phases | 291 | 706 |
| Ex. 6 | $Mm(Ni_{0.6}Mn_{0.4})_{4.4}$ | 1:4.4 | 2 phases | 343 | 300 |
| Ex. 7 | $Mm(Ni_{0.95}Mn_{0.05})_4Fe_{0.4}$ | 1:4.4 | 2 phases | 331 | 580 |
| Ex. 8 | $Mm(Ni_{0.95}Mn_{0.05})_{3.6}Fe_{0.4}$ | 1:4 | 2 phases | 300 | 605 |
| Ex. 9 | $Mm(Ni_{0.6}Mn_{0.4})_4Fe_{0.4}$ | 1:4.4 | 2 phases | 348 | 550 |
| Ex. 10 | $Mm(Ni_{0.6}Mn_{0.4})_{3.6}Fe_{0.4}$ | 1:4 | 2 phases | 315 | 625 |

TABLE 2

| | Alloy Composition | p:q | Micro-structure | Electrode Capacity (mAh/g) | Cycle Life (times) |
|---|---|---|---|---|---|
| Ex. 11 | $Mm(Ni_{0.95}Mn_{0.05})_4Fe_{0.2}$ | 1:4.2 | 2 phases | 322 | 805 |
| Ex. 12 | $Mm(Ni_{0.95}Mn_{0.05})_{3.6}Fe_{0.2}$ | 1:3.8 | 2 phases | 285 | 826 |
| Ex. 13 | $Mm(Ni_{0.95}Mn_{0.05})_{4.2}Fe_{0.2}$ | 1:4.4 | 2 phases | 328 | 537 |
| Ex. 14 | $Mm(Ni_{0.6}Mn_{0.4})_4Fe_{0.2}$ | 1:4.2 | 2 phases | 331 | 650 |
| Ex. 15 | $Mm(Ni_{0.6}Mn_{0.4})_{3.6}Fe_{0.2}$ | 1:3.8 | 2 phases | 304 | 636 |
| Ex. 16 | $Mm(Ni_{0.6}Mn_{0.4})_{4.2}Fe_{0.2}$ | 1:4.4 | 2 phases | 351 | 500 |
| Ex. 17 | $Mm(Ni_{0.95}Mn_{0.05})_4Cr_{0.4}$ | 1:4.4 | 2 phases | 310 | 625 |
| Ex. 18 | $Mm(Ni_{0.95}Mn_{0.05})_{3.6}Cr_{0.4}$ | 1:4 | 2 phases | 293 | 762 |
| Ex. 19 | $Mm(Ni_{0.6}Mn_{0.4})_4Cr_{0.4}$ | 1:4.4 | 2 phases | 306 | 603 |
| Ex. 20 | $Mm(Ni_{0.6}Mn_{0.4})_{3.6}Cr_{0.4}$ | 1:4 | 2 phases | 285 | 812 |

TABLE 3

| | Alloy Composition | p:q | Micro-structure | Electrode Capacity (mAh/g) | Cycle Life (times) |
|---|---|---|---|---|---|
| Ex. 21 | $Mm(Ni_{0.95}Mn_{0.05})_4Cr_{0.2}$ | 1:4.2 | 2 phases | 308 | 615 |
| Ex. 22 | $Mm(Ni_{0.95}Mn_{0.05})_{3.6}Cr_{0.2}$ | 1:3.8 | 2 phases | 270 | 850 |
| Ex. 23 | $Mm(Ni_{0.95}Mn_{0.05})_{4.2}Cr_{0.2}$ | 1:4.4 | 2 phases | 311 | 600 |
| Ex. 24 | $Mm(Ni_{0.6}Mn_{0.4})_4Cr_{0.2}$ | 1:4.2 | 2 phases | 313 | 625 |
| Ex. 25 | $Mm(Ni_{0.6}Mn_{0.4})_{3.6}Cr_{0.2}$ | 1:3.8 | 2 phases | 268 | 848 |
| Ex. 26 | $Mm(Ni_{0.6}Mn_{0.4})_{4.2}Cr_{0.2}$ | 1:4.4 | 2 phases | 315 | 604 |
| Ex. 27 | $Mm(Ni_{0.95}Mn_{0.05})_4Cu_{0.4}$ | 1:4.4 | 2 phases | 329 | 605 |
| Ex. 28 | $Mm(Ni_{0.95}Mn_{0.05})_{3.6}Cu_{0.4}$ | 1:4 | 2 phases | 315 | 621 |
| Ex. 29 | $Mm(Ni_{0.6}Mn_{0.4})_4Cu_{0.4}$ | 1:4.4 | 2 phases | 336 | 585 |
| Ex. 30 | $Mm(Ni_{0.6}Mn_{0.4})_{3.6}Cr_{0.4}$ | 1:4 | 2 phases | 320 | 630 |

TABLE 4

| | Alloy Composition | p:q | Micro-structure | Electrode Capacity (mAh/g) | Cycle Life (times) |
|---|---|---|---|---|---|
| Ex. 31 | $Mm(Ni_{0.95}Mn_{0.05})_4Cu_{0.2}$ | 1:4.2 | 2 phases | 325 | 802 |
| Ex. 32 | $Mm(Ni_{0.95}Mn_{0.05})_{3.6}Cu_{0.2}$ | 1:3.8 | 2 phases | 270 | 850 |
| Ex. 33 | $Mm(Ni_{0.95}Mn_{0.05})_{4.2}Cu_{0.2}$ | 1:4.4 | 2 phases | 325 | 535 |
| Ex. 34 | $Mm(Ni_{0.6}Mn_{0.4})_4Cu_{0.2}$ | 1:4.2 | 2 phases | 328 | 670 |
| Ex. 35 | $Mm(Ni_{0.6}Mn_{0.4})_{3.6}Cu_{0.2}$ | 1:3.8 | 2 phases | 303 | 650 |
| Ex. 36 | $Mm(Ni_{0.6}Mn_{0.4})_{4.2}Cu_{0.2}$ | 1:4.4 | 2 phases | 348 | 506 |
| Ex. 37 | $Mm(Ni_{0.95}Mn_{0.05})_4Al_{0.4}$ | 1:4.4 | 2 phases | 325 | 620 |
| Ex. 38 | $Mm(Ni_{0.95}Mn_{0.05})_{3.6}Al_{0.4}$ | 1:4 | 2 phases | 318 | 625 |
| Ex. 39 | $Mm(Ni_{0.6}Mn_{0.4})_4Al_{0.4}$ | 1:4.4 | 2 phases | 325 | 592 |

TABLE 4-continued

| Alloy Composition | p:q | Micro-structure | Electrode Capacity (mAh/g) | Cycle Life (times) |
|---|---|---|---|---|
| Ex. 40 $Mm(Ni_{0.6}Mn_{0.4})_{3.6}Al_{0.4}$ | 1:4 | 2 phases | 315 | 621 |

TABLE 5

| Alloy Composition | p:q | Micro-structure | Electrode Capacity (mAh/g) | Cycle Life (times) |
|---|---|---|---|---|
| Ex. 41 $Mm(Ni_{0.95}Mn_{0.05})_4Al_{0.2}$ | 1:4.2 | 2 phases | 318 | 798 |
| Ex. 42 $Mm(Ni_{0.95}Mn_{0.05})_{3.6}Al_{0.2}$ | 1:3.8 | 2 phases | 272 | 848 |
| Ex. 43 $Mm(Ni_{0.95}Mn_{0.05})_{4.2}Al_{0.2}$ | 1:4.4 | 2 phases | 324 | 550 |
| Ex. 44 $Mm(Ni_{0.6}Mn_{0.4})_4Al_{0.2}$ | 1:4.2 | 2 phases | 325 | 665 |
| Ex. 45 $Mm(Ni_{0.6}Mn_{0.4})_3Al_{0.2}$ | 1:3.8 | 2 phases | 298 | 640 |
| Ex. 46 $Mm(Ni_{0.6}Mn_{0.4})_{4.2}Al_{0.2}$ | 1:4.4 | 2 phases | 335 | 505 |

TABLE 6

| Alloy Composition | p:q | Micro-structure | Electrode Capacity (mAh/g) | Cycle Life (times) |
|---|---|---|---|---|
| Com. Ex. 1 $Mm(Ni_{0.95}Mn_{0.05})_{4.5}$ | 1:4.5 | $CaCu_5$ type | 345 | 83 |
| Com. Ex. 2 $Mm(Ni_{0.95}Mn_{0.05})_{3.5}$ | 1:3.5 | $Ce_2Ni_7$ type | 200 | 95 |
| Com. Ex. 3 $Mm(Ni_{0.95}Mn_{0.05})_4Fe_{0.5}$ | 1:4.5 | $CaCu_5$ type | 330 | 78 |
| Com. Ex. 4 $Mm(Ni_{0.6}Mn_{0.4})_{4.4}Fe_{0.1}$ | 1:4.5 | $CaCu_5$ type | 360 | 85 |
| Com. Ex. 5 $Mm(Ni_{0.95}Mn_{0.05})_4Cr_{0.5}$ | 1:4.5 | $CaCu_5$ type | 320 | 93 |
| Com. Ex. 6 $Mm(Ni_{0.6}Mn_{0.4})_{4.4}Cr_{0.1}$ | 1:4.5 | $CaCu_5$ type | 325 | 99 |
| Com. Ex. 7 $Mm(Ni_{0.95}Mn_{0.05})_4Cu_{0.5}$ | 1:4.5 | $CaCu_5$ type | 340 | 75 |
| Com. Ex. 8 $Mm(Ni_{0.6}Mn_{0.4})_{4.4}Cu_{0.1}$ | 1:4.5 | $CaCu_5$ type | 348 | 78 |
| Com. Ex. 9 $Mm(Ni_{0.95}Mn_{0.05})_4Al_{0.5}$ | 1:4.5 | $CaCu_5$ type | 339 | 76 |
| Com. Ex. 10 $Mm(Ni_{0.6}Mn_{0.4})_{4.4}Al_{0.1}$ | 1:4.5 | $CaCu_5$ type | 349 | 77 |

As can be seen from Tables 1 to 6, the alloys obtained in Examples 1 to 46 were excellent in both electrode capacity and cycle life.

Comparative Example 11

For a comparison purpose, an electrode and a battery were fabricated using a Co-containing alloy, which has been conventionally known by the excellent characteristics, in the same manner as in Example 1, and the electrode capacity and cycle life were measured. The results are shown in Table 7.

TABLE 7

| Alloy Example | Alloy Composition | p:q | Micro-structure | Electrode Capacity (mAh/g) | Cycle Life (times) |
|---|---|---|---|---|---|
| Com. Ex. 11 | $MmNi_{3.55}Mn_{0.4}Al_{0.3}Co_{0.75}$ | 1:5 | $CaCu_5$ type | 300 | 800 |

As can be seen from Table 1 to Table 7, the alkaline storage batteries of the present invention have characteristics similar to the battery produced using the Co-containing alloy although their hydrogen storage alloys do not contain Co.

While particles of Co are present on the surface of the hydrogen storage alloy powders due to the alkali treatment, the amount is much smaller compared to a hydrogen storage alloy electrode. In the present examples, the maximum amount was made 0.5% by weight.

On the other hand, Comparative Examples 1 and 3 to 7 using alloys which depart from the composition range of the present invention and have $CaCu_5$ type single-phase crystal structures exhibited large electrode capacities, but they had poor cycle lives.

The cause of this would be that the $CaCu_5$ type alloys mainly composed of the A-element components are heavily pulverized during cycles. Moreover, in Comparative Example 2 using an alloy of a $Ce_2Ni_7$ type single-phase crystal structure, the electrode capacity became smaller. The reason why it had poor cycle life would be that the battery capacity was soon limited at the negative electrode due to the low capacity thereof and a shuttle reaction in overcharge was interfered.

Examples 47 to 53

Here, the effects of addition of other elements to the alloy of Example 1 were studied.

First, nine types of hydrogen storage alloy electrodes having the compositions shown in Table 8 were produced in the same manner as in Example 1. Since the alloys had different compositions, only the weighed amounts were varied, and other production conditions and method were the same as those of Example 1. All of these alloys had multi-phases, and some deposition phases other than a phase having a $CaCu_5$ type crystal structure and a phase having a $Ce_2Ni_7$ type crystal structure appeared. Since these deposition phases were small, their crystal structures could not have been identified.

Moreover, with the use of these hydrogen storage alloy electrodes, test cells for measurement of electrode capacity and sealed batteries for measurement of cycle life were fabricated by the same method as in Example 1, and the electrode capacities and the cycle lives were measured.

Table 8 shows the compositions of the hydrogen storage alloys, electrode capacities and cycle lives resulting an from Examples 47 to 53.

TABLE 8

| Alloy Example | Alloy Composition | Electrode Capacity (mAh/g) | Cycle Life (times) |
|---|---|---|---|
| Ex. 47 | $Mm(Ni_{0.85}Mn_{0.15})_4Cu_{0.2}$-5% Ti | 307 | 605 |
| Ex. 48 | $Mm(Ni_{0.85}Mn_{0.15})_4Cu_{0.2}$-5% V | 305 | 687 |

TABLE 8-continued

| Alloy Example | Alloy Composition | Electrode Capacity (mAh/g) | Cycle Life (times) |
|---|---|---|---|
| Ex. 49 | $Mm(Ni_{0.85}Mn_{0.15})_4Cu_{0.2}$-5% Zr | 310 | 645 |
| Ex. 50 | $Mm(Ni_{0.85}Mn_{0.15})_4Cu_{0.2}$-5% Nb | 317 | 656 |
| Ex. 51 | $Mm(Ni_{0.85}Mn_{0.15})_4Cu_{0.2}$-5% Mo | 314 | 687 |
| Ex. 52 | $Mm(Ni_{0.85}Mn_{0.15})_4Cu_{0.2}$-5% Si | 300 | 642 |
| Ex. 53 | $Mm(Ni_{0.85}Mn_{0.15})_4Cu_{0.2}$-5% Ge | 305 | 656 |

According to Table 8, since the alloys obtained by adding Ti, V, Zr, Nb, Mo, Si and Ge became multi-phase alloys although the mechanism is unknown, they exhibited excellent electrode capacities and cycle lives.

The effects of the addition are enhanced in proportion to the added amount, but if the amount exceeds 10% by weight, the deposition phases increase, resulting in more demerits such as a lowering of the cycle life. It can therefore be understood that the amount to be added is preferably not more than 10% by weight.

As explained above, although a hydrogen storage alloy electrode formed of a hydrogen storage alloy containing a little or no Co is used for an alkaline storage battery of the present invention, since the $CaCu_5$ type region and the $Ce_2Ni_7$ type region coexist in the crystal structure of the hydrogen storage alloy, the alkaline storage battery has little deterioration due to pulverization of the alloy and a high capacity.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A hydrogen storage alloy electrode composed of a hydrogen storage alloy which has a $CaCu_5$ type region and a $Ce_2Ni_7$ type region in the crystal structure thereof and satisfies the relational formula $$p:q=1:(4+a)$$

where p is the sum of the mole fraction of an element occupying the Ca site of said $CaCu_5$ type region and the mole fraction of an element occupying the Ce site of said $Ce_2Ni_7$ type region, q is the sum of the mole fraction of an element occupying the Cu site of said $CaCu_5$ type region and the mole fraction of an element occupying the Ni site of said $Ce_2Ni_7$ type region, and $-0.2 \leq a \leq 0.4$.

2. The hydrogen storage alloy electrode in accordance with claim 1,
wherein said hydrogen storage alloy is represented by the compositional formula:

$$R(Ni_{1-y}Mn_y)_{4+a}M_b$$

where R is at least one kind of La, Ce, Sm, Nd, Pr and misch metal, M is at least one kind of Fe, Cr, Cu and Al, $0.05 \leq y \leq 0.4$, $-0.2 \leq a \leq 0.4$, $0 \leq b \leq 0.4$, and $a+b \leq 0.4$).

3. The hydrogen storage alloy electrode in accordance with claim 1, wherein said hydrogen storage alloy contains 1 to 10% by weight of L, where L is at least one kind of Ti, V, Zr, Nb, Mo, Si and Ge.

4. The hydrogen storage alloy electrode in accordance with claim 1, wherein particles of Co are present on a surface of said hydrogen storage alloy.

5. An alkaline storage battery comprising: a negative electrode composed of the hydrogen storage alloy electrode of claim 1; a positive electrode composed of nickel hydroxide; a separator electrically separating said negative electrode and said positive electrode; an alkaline electrolyte; and a sealed container with a safety valve.

6. The alkaline storage battery in accordance with claim 5, wherein particles of Co are present on a surface of said hydrogen storage alloy.

7. The alkaline storage battery in accordance with claim 5 or 6, wherein said hydrogen storage alloy contains 1 to 10% by weight of L, where L at least one kind of Ti, V, Zr, Nb, Si and Ge.

8. A method for producing a hydrogen storage alloy electrode, comprising the steps of:

(a) preparing components satisfying the compositional formula:

$$R(Ni_{1-y}Mn_y)_{4+a}M_b$$

where R is at least one kind of La, Ce, Sm, Nd, Pr and misch metal, M is at least one kind of Fe, Cr, Cu and Al, $0.05 \leq y \leq 0.4$, $-0.2 \leq a \leq 0.4$, $0 \leq b \leq 0.4$, and $a+b \leq 0.4$;

(b) melting said components and synthesizing and obtain a hydrogen storage alloy by an atomization method, a roll rapid quenching method or a centrifugal spraying method;

(c) heat-treating said hydrogen storage alloy at a temperature between 500° C. and 1065° C. in a vacuum or in an inert gas; and (d) joining said hydrogen storage alloy and a support integrally to form an electrode.

9. The method for producing a hydrogen storage alloy electrode in accordance with claim 8, comprising, after step (c) but before step (d), the step of immerse-treating said hydrogen storage alloy in an alkali solution, which has a temperature between 80° C. and a boiling point and contains a cobalt oxide, cobalt hydroxide or cobalt salt added thereto.

10. The method for producing a hydrogen storage alloy electrode in accordance with claim 8, comprising the step of adding 1 to 10% by weight of L, where L is at least one kind of Ti, V, Zr, Nb, Mo, Si and Ge, to said hydrogen storage alloy.

* * * * *